March 27, 1951

J. A. NEFF 2,546,772

FISH LURE WITH INTERCHANGEABLE
BODIES OF DIFFERENT CHARACTER

Filed March 8, 1946

Inventor

James A. Neff

By Randolph & Beavers

Attorneys

Patented Mar. 27, 1951

2,546,772

UNITED STATES PATENT OFFICE 2,546,772

FISH LURE WITH INTERCHANGEABLE BODIES OF DIFFERENT CHARACTER

James A. Neff, Berea, Ohio

Application March 8, 1946, Serial No. 653,021

1 Claim. (Cl. 43—42.09)

My invention relates to an improvement on fishing tackles of the type which is generally called "fish lure." The object of the invention is to provide a series of differently colored and shaped bodies for a common head to which several sets of fish hooks are attached.

Since different lures are needed for different fishing conditions, all that the angler has to do is to detach one body from the head and replace it by another of different type or color.

This feature will be appreciated by fishermen who desire to carry with them an assortment of lures for different conditions, as the present invention enables them to carry a single lure head with a set of hooks and exchangeable bodies, instead of a great number of complete fish lures, each with a different body and head, together with a set of hooks.

Another advantage resides in the fact that the heads are adjustable as to weight by simply filling its cavity with water or lead shot.

One embodiment of the invention is illustrated in the accompanying drawing wherein like reference numerals denote the same details in the different views—

Figure 1:
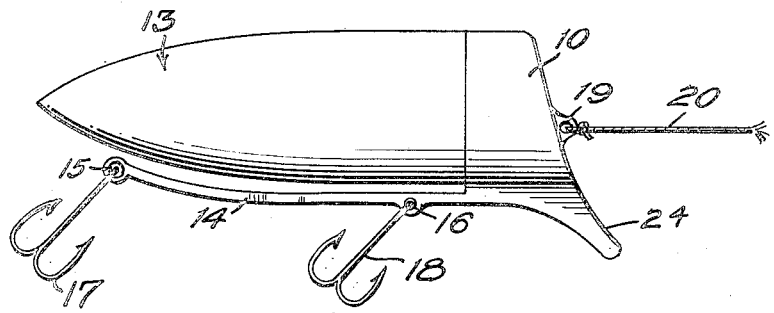
Figure 1 is a side elevation of the assembled fish lure.
Figure 2:
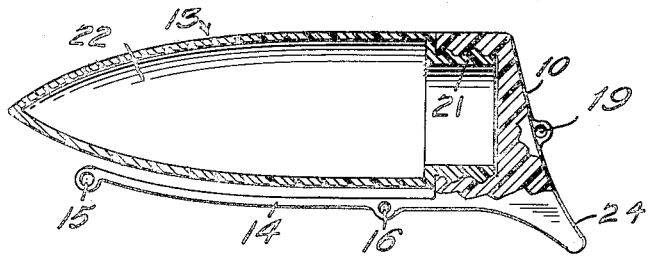
Figure 2 is an axial vertical section of Figure 1 with some parts in side elevation.
Figure 3:
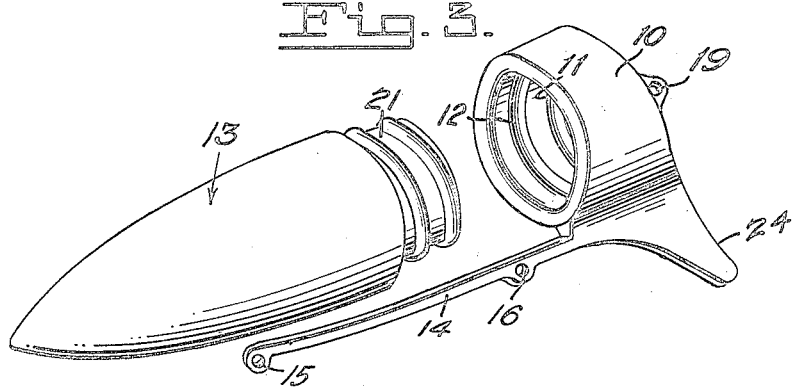
Figure 3 is a perspective view of head and body separated.

From the following description aided by the drawing the invention will be fully understood together with its advantages and specific features.

A head 10 has an axial recess 11 formed with threads 12 or other means for detachable connection with a body 13. A slender tail piece 14 formed in one piece with the head 10, extends rearwardly therefrom nearly to the end of the body 13 and terminates in an eye 15 for carrying a fish hook 17 while another eye 16 near the head proper 10 carries another hook 18.

The tail piece, preferably, is curved to follow the curvature of the body 13 but is slightly spaced therefrom. A third eye 19 is provided on the front side of the head and through which a fish line 20 is looped and knotted.

The body 13 may be given any desirable shape, but is here shown in the form of a hollow shell with a reduced neck 21 which is threaded to fit the threaded interior of the head. This neck 21 is open at the front end and communicates at the rear with the interior 22 of the shell 13.

Therefor, the chamber 22 may be filled with water or lead shot in order to make the fish lure of the desired weight for different fishing conditions.

The material used for the head is preferably plastic, with the head and tail piece cast in one. The overall length of the head and tail may be varied according to the number of hooks, whether one, two or three.

Figure 4:
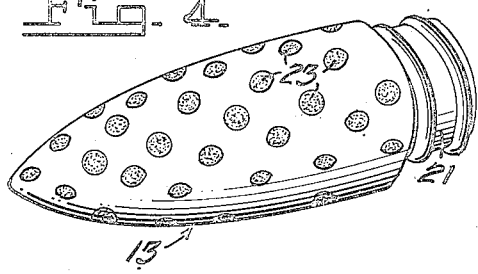
Figure 4 is a perspective view of a head slightly modified as to decoration.

The body 13 may also be made of suitable material, when the outer surface is brightly colored in stripes, spots, silvered or other distinctive decoration, or different pattern. Preferably, however, transparent glass is used, which may be left transparent and shiny. The glass may also be silvered or else painted with bright or silvered spots 23 as indicated in Figure 4.

The body and the head will be shaped to obtain best action, when propelled in water. So for instance, a projecting toe 24 is shown on the head 10 for balance.

It is to be understood that the invention as here disclosed is not limited to the details herein described and shown, but that the same may be varied without departing from the spirit of the invention as defined by the subjoined claim.

I claim:

A fish lure comprising a head portion having a threaded recess in the rear end thereof, an elongated hollow body provided with a forwardly extending reduced neck, said neck being provided with threads for threaded disposition in the recess of the head, said head being formed with a depending portion, said depending portion being provided with an elongated narrow tail piece extending in parallel spaced relation to said body and having its free end terminating adjacent the rear end of the body whereby the body may be readily unscrewed from the head, said tail piece having an eye formed at its free end and having an eye adjacent the head, and hooks attached to said eyes.

JAMES A. NEFF.

REFERENCES CITED

The following references are of record in the file of this patent:

UNITED STATES PATENTS

| Number | Name | Date |
|---|---|---|
| 1,477,864 | Bolton | Dec. 8, 1923 |
| 1,807,283 | Dick | May 26, 1931 |
| 1,850,086 | Segal | Mar. 22, 1932 |
| 1,878,015 | Steffensen | Sept. 20, 1932 |
| 2,017,903 | Johnson | Oct. 22, 1935 |
| 2,112,385 | Smith | Mar. 29, 1938 |
| 2,163,666 | Carter et al. | June 27, 1939 |
| 2,218,421 | Edgar | Oct. 15, 1940 |
| 2,228,591 | Brown | Jan. 14, 1941 |
| 2,295,292 | Rogers | Sept. 8, 1942 |
| 2,387,255 | Goodlewski | Oct. 23, 1945 |